(12) United States Patent
Fischer et al.

(10) Patent No.: US 8,667,204 B2
(45) Date of Patent: Mar. 4, 2014

(54) METHOD TO DIFFERENTIATE IDENTICAL DEVICES ON A TWO-WIRE INTERFACE

(75) Inventors: Armin Fischer, Romerstein (DE); Joachim Riexinger, Gammelshausen (DE); Frank Kronmueller, Neudenau (DE)

(73) Assignee: RPX Corporation, San Francisco, CA (US)

( * ) Notice: Subject to any disclaimer, the term of this patent is extended or adjusted under 35 U.S.C. 154(b) by 128 days.

(21) Appl. No.: 12/931,063

(22) Filed: Jan. 24, 2011

(65) Prior Publication Data

US 2012/0191889 A1 Jul. 26, 2012

(51) Int. Cl.
*G06F 3/00* (2006.01)
*G06F 13/00* (2006.01)
*G06F 13/14* (2006.01)

(52) U.S. Cl.
USPC ....... 710/305; 710/3; 710/8; 710/14; 710/110

(58) Field of Classification Search
USPC ......... 710/3–4, 8–10, 14, 300–302, 104–106, 710/110, 305, 316
See application file for complete search history.

(56) References Cited

U.S. PATENT DOCUMENTS

| | | | | |
|---|---|---|---|---|
| 5,376,928 A | * | 12/1994 | Testin | 710/105 |
| 5,852,406 A | * | 12/1998 | Edde et al. | 340/4.2 |
| 7,444,453 B2 | | 10/2008 | Ellison | |
| 7,849,244 B2 | | 12/2010 | Huang et al. | |
| 2002/0190755 A1 | * | 12/2002 | Lee | 326/86 |
| 2007/0064819 A1 | * | 3/2007 | Langer | 375/257 |
| 2008/0288684 A1 | | 11/2008 | Ellison | |
| 2011/0102053 A1 | * | 5/2011 | Wang | 327/365 |

OTHER PUBLICATIONS

Vassilevsky, Vladimir, et al. "Discussion Groups | Comp.Arch.Embedded | I2C trick?". EmbeddedRelated.com forum. Dec. 28-30, 2007. Retrieved from Internet Jul. 18, 2013. <http://www.embeddedrelated.com/usenet/embedded/show/87359-1.php>.*
UM10204, I2C-bus specification and user manual, Rev. 03-19 Jun. 2007, NXP B.V., pp. 1-50.
The I2C-bus specification; version 2.1, Jan. 2000, Philips Semiconductors, pp. 1-46.

* cited by examiner

*Primary Examiner* — Thomas J Cleary
(74) *Attorney, Agent, or Firm* — Howison & Arnott, L.L.P.

(57) ABSTRACT

Systems and methods for providing a differentiation of two identical slave devices on a same I$^2$C bus without any hardware (e.g. additional ID pins) or software overhead are disclosed. Each identical slave device is connected to the SDA/SCL lanes by interchanging its SDA/SCL ports. It is up to the slave device to detect its signal connectivity to the SDA/SCL lanes of the I$^2$C bus. The slave devices detect the signal connectivity by interpreting the I$^2$C transfer in normal and interchanged connectivity.

13 Claims, 5 Drawing Sheets

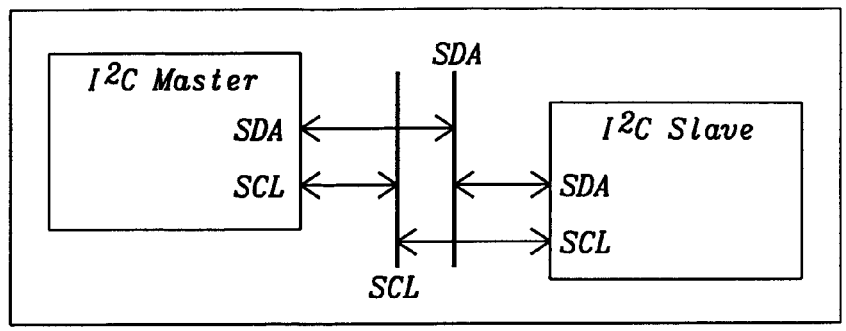
FIG. 1 — Prior Art
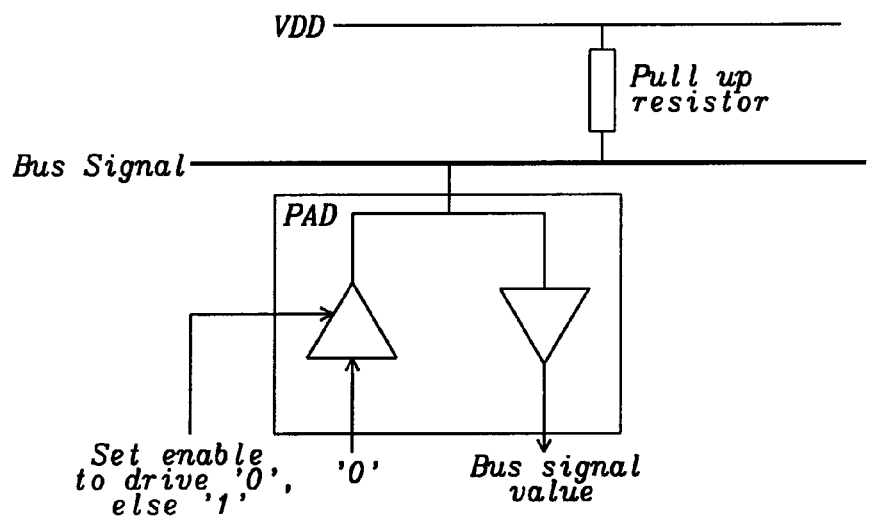
FIG. 2 — Prior Art
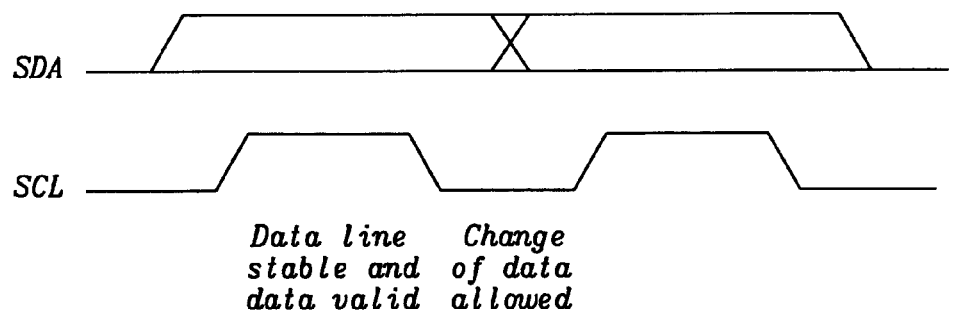
FIG. 3 — Prior Art

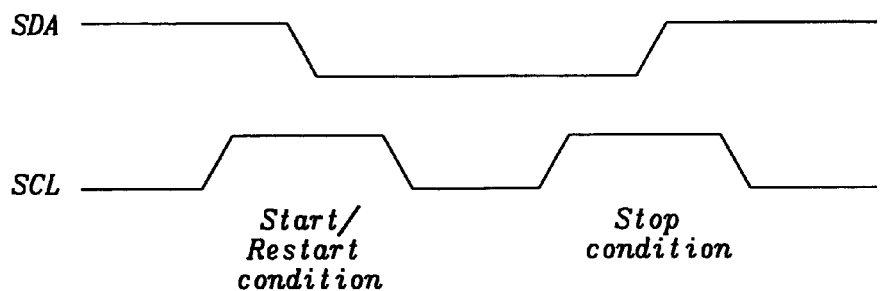
FIG. 4 — Prior Art
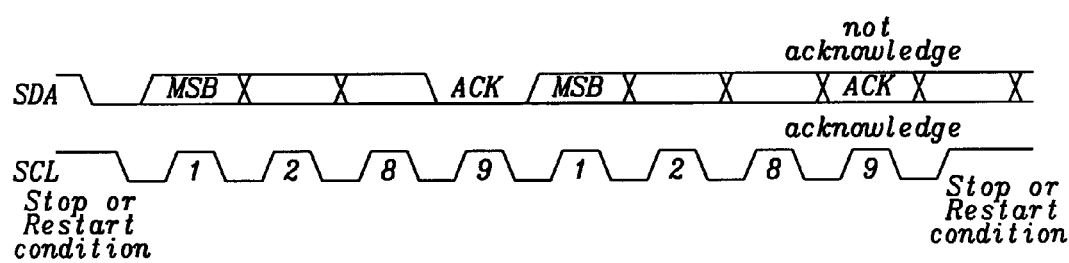
FIG. 5 — Prior Art
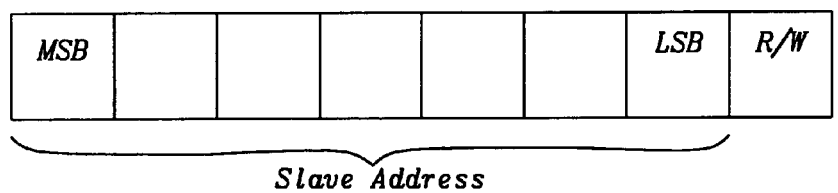
FIG. 6 — Prior Art

METHOD TO DIFFERENTIATE IDENTICAL DEVICES ON A TWO-WIRE INTERFACE

BACKGROUND (1) Field of the Invention

This invention relates generally to electronic interfaces and relates more specifically to two wire interfaces.

(2) Description of the Prior Art

The Inter-Integrated Circuit ($I^2C$), also called two-wire interface (TWI) interface is a 2-wire interface for low speed communication between electrical components. The communication is always initiated from the master component. The destination of this communication or slave is selected by a unique device address or device ID transmitted at the beginning of the communication. Only the selected slave is allowed to answer the request of the master.

In complex systems it often happens that 2 devices have the same device address or are even equal components with the same device address. In this case a master's request has always more than one slave, which is reacting. This causes violations on the bus and makes a communication impossible.

Possible solutions to solve these violations are:
1. Device dependent, hard coded slave address selection:
   The usage of an extra input or inputs to a device allows selecting between different slave addresses the device is reacting on. Using equal devices on the same bus are then distinguishable if the slave address selection input is set different.
   Disadvantage:
   a. There need to be an extra pin on the component in case the slave address selection is controlled from the system. As these devices are getting smaller and smaller additional pins/pads are not desirable.
   b. There is no extra input pin to the device in case the slave address selection input is hard wired in the device (e.g. chip bonding option). Having this scenario, identical devices cannot be exchanged; e.g. having a stereo camera system with 2 identical cameras there is a need to separate the cameras during manufacturing. The cameras need to be held separately and cannot be exchanged. This increase the logistic overhead for the system builds.
2. Programmable device address during startup:
   This mechanism allows programming the device address of a slave via software. Possible implementations are:
   a. Non-volatile memory in the device or component that contain the slave address selection. The slave address selection is read out by the device/component by its own at start up.
      Disadvantage: Need for none-volatile memory component in the device. In addition same disadvantage as under 1.b)
   b. Special startup strategy.
      To avoid that 2 slaves react on a given device ID the system could power up one device first and reprogram the device address (needs to be foreseen to allow reprogramming of slave address with the given control bus). The second device with the same slave address is not able to react on this request because it is not yet powered on. Thus no violation on the control bus can happen. After reprogramming the slave address of the first device the second one can be powered up. After this special startup the 2 devices can be differentiated.

Two Wire Interface—Overview

The TWI or I2C control bus uses 2 lanes, a serial data lane (SDA) and a serial clock lane (SCL). The data lane is used to transfer the information whereas the clock lane controls or validates the data information flow. It is realized as shown in FIG. 1 prior art.

Master and slave are connected to the Serial Data Line (SDA) and Serial Clock line (SCL) via an Open-Drain or Open-Collector circuit. This allows that several devices can access the bus in parallel. An Open-Drain/Open-Collector circuit is shown in FIG. 2 prior art.

An Open-Drain/Open-Collector circuit is shown in FIG. 2 prior art. For the Open-Drain or Open-Collector circuit the according bus line is pulled up to VDD via a pull-up resistor, while the device does only drive '0' on the bus. The resulting signal level on the bus is an AND combination of the outputs of all devices connected to the line.

FIG. 3 prior art shows different states of the SDA and SCL lines i.e. when data line is stable and valid and when change of data is allowed. The data on the two serial lines of the $I^2C$ bus are transferred bit by bit. The data bit on the SDA line is valid during the SCL line is high. During this high period of the SCL line the SDA data line must be stable. If the SCL line is low state a change of the SDA data line is allowed and the SDA value is not valid.

As illustrated in FIG. 4 prior art the $I^2C$ bus defines special conditions called Start (S) and Stop (P) additionally to the bit transfer. The Start condition signals a start of data transfer whereas the stop condition terminates the bus transfer. A start condition occurs when there is a transition of the SDA line from high to low while the SCL line is high. A stop condition occurs if the SDA line goes from low to high while the SCL line is asserted.

The master device generates the Start and Stop conditions, whereas data transfer can happen in both directions (read/write). Instead of termination a bus transfer with the stop command an immediate new transfer can be started by the master with a repeated Start (SR) command as shown in FIG. 4 prior art. The repeated start command has the same characteristics as the normal Start condition.

The data transfer on the I2C bus, shown in FIG. 5 prior art, is done in byte packets (8 bit). The number of bytes that can be transmitted in a transfer cycle is not restricted. Each byte is transmitted with the most significant bit (MSB) first and each byte is followed by an acknowledge toggle bit (ACK). The device receiving the data bits sets the acknowledge bit (master sends data and the slave acknowledges or slave sends data and master acknowledges).

For the acknowledge clock cycle the receiver of the data byte must pull down the SDA line so that it is stable low during the high period of SCL. The acknowledge cycle occurs after each transmitted byte.

If a slave is not able to process a transfer or additional bytes it leaves the SDA line in high state (not acknowledge). In case of a write access the master has to start a new transfer to write the data byte that was not acknowledged. If the slave transmits data to the master (read access) the master has to not acknowledge the last byte of the transfer to signal the slave to release the data line. This allows the master to set a Stop or Restart condition. Anyway a not acknowledged byte is followed by a stop or restart condition of the master device in any case.

FIG. 6 prior art illustrates a possible data transfer terminology is mentioned as 7-bit addressing in the specification. This invention can also be expanded to other addressing modes like the ones also mentioned in [1] and [2]. In this mode a 7-bit address is sent by the master after the start/restart condition. This 7-bit address selects the slave to be accessed.

The eighth bit of the first byte specifies the data transfer direction. A '0' represent a write access whereas a '1' indicates a read. Only the addressed slave, i.e. the slave with a transmitted and unique slave address is assigned to and is allowed to react or answer the access.

It is a challenge for engineers to differentiate identical devices on a two-wire interface.

There are known patents or patent publications dealing with master/slave communication of two wire interfaces:

U.S. Patent Publication (US 2009/0234999 to Huang et al.) teaches an apparatus for resolving conflicts happening between two I2C slave devices with the same addressed address. The apparatus is composed by all cheap electronic devices, so as to achieve a purpose of lowering a cost for design. In addition, in the apparatus for resolving conflicts happened between two I2C slave devices with the same addressed address of the invention, all the I2C slave devices are addressed by an I2C master device to perform the data transmission subsequently before a basic input/output system (BIOS) completes a power-on self-test (POST), but all the I2C slave devices are addressed by a system chip (for example, a baseboard management controller (BMC)) to perform the data transmission subsequently after the BIOS completes the POST. Therefore, the purpose of performing the data transmission for all the I2C slave devices on real time is achieved.

U.S. Patent Publication (US 2008/0288684 to Ellison) discloses a design structure to facilitate I2C communication between a host device and a slave device where the slave device shares a common physical address with another slave device on the I2C bus. The design structure includes an apparatus, which includes a detection module to detect an incoming address on the I2C bus, a translation module to translate the incoming address to an outgoing address, and a communication module to communicate data between the host device and the slave device where the outgoing address matches the physical address of the slave device. In this manner, address conflicts between commonly addressed slave devices can be avoided while reducing costs, components, and complexities traditionally associated with dynamic addressing techniques and other prior art solutions to address conflicts.

U.S. Patent (U.S. Pat. No. 7,444,453 to Ellison) discloses a method to facilitate I2C communication between a host device and a slave device where the slave device shares a common physical address with another slave device on the I2C bus. The method includes detecting an incoming address on the I2C bus, translating the incoming address to an outgoing address, and communicating data between the host device and the slave device where the outgoing address matches the physical address of the slave device. In this manner, the present invention avoids address conflicts between commonly addressed slave devices while reducing costs, components, and complexities traditionally associated with dynamic addressing techniques and other prior art solutions to address conflicts.

Furthermore two publications describe addressing schemes of two wire interfaces:

[1] UM10204, I2C-bus specification and user manual, Rev. 03-19 June 2007, NXP B.V,
[2] The I2C-bus specification; version 2.1, January 2000, Philips Semiconductors.

SUMMARY

A principal object of the present invention is to achieve a method to differentiate identical devices on a two-wire interface.

A further object of the invention is to achieve a method to differentiate identical devices on a two-wire interface without requiring any hardware overhead.

A further object of the invention is to achieve a method to differentiate identical devices on a two-wire interface without requiring any software overhead.

Moreover an object of the invention is to achieve a system to differentiate identical devices on a two-wire interface without requiring any software or hardware overhead.

In accordance with the objects of this invention a method to differentiate identical devices on a two-wire interface has been achieved. The method invented comprising, firstly, the steps of: (1) providing a two-wire communication system comprising a SDA and a SCL lane, an $I^2C$ master and two identical $I^2C$ slave devices, (2) connecting physically the SDA and SCL lanes to each slave device, wherein each slave is connected by interchanging its SDA and SCL ports, and (3) performing signal connectivity check by detecting signal connectivity by a slave device by interpreting information transfer in normal and exchanged signal connectivity modes. Furthermore the method comprises the steps of: (4) fixing a signal connectivity mode selection as soon as any correct slave device ID is detected, and (5) selecting detected correct slave ID for communication.

In accordance with the objects of this invention an $I^2C$ interface system with slave devices connected to a two-wire control bus enabled to differentiate identical slave devices has been achieved. The system invented comprises, firstly: an $I^2C$ control bus comprising a serial data line (SDA) lane and a serial clock line (SCL) lane and at least two identical slave devices. Each of the identical slave devices comprises: an $I^2C$ slave module having a (SDA) port and a (SCL) port wherein the SDA port is connected to a first input port of a circuitry interchanging SDA/SCL connections and the SCL port is connected to a second input of said circuitry, said circuitry connecting said first input port to the SCL lane, to a SCL port of a first slave ID decoder, and to a SDA port of a second slave ID decoder, and connecting said second input port to the SDA lane, to a SDA port of a first slave ID decoder, and to a SCL port of a second slave ID decoder, said first slave ID decoder, and said second slave ID decoder.

BRIEF DESCRIPTION OF THE DRAWINGS

In the accompanying drawings forming a material part of this description, there is shown:

FIG. 1 prior art shows an $I^2C$ control bus using 2 lanes, a data lane (SDA) and a clock lane (SCL).

FIG. 2 prior art shows an Open-Drain/Open-Collector circuit of an $I^2C$ bus.

FIG. 3 prior art shows different states of the SDA and SCL lines of an $I^2C$ bus, i.e. when data line is stable and valid and when change of data is allowed.

FIG. 4 prior art illustrates that the $I^2C$ bus defines special conditions called Start (S) and Stop (P) additionally to the bit transfer FIG. 5 prior art shows the data transfer on the $I^2C$ bus.

FIG. 6 prior art shows a 7-bit address sent by the master after the start/restart condition.

DESCRIPTION OF THE PREFERRED EMBODIMENTS

Methods and systems to differentiate identical devices on a two-wire interface are disclosed. The present invention discloses a way to differentiate those identical devices on one control bus without any additional hardware, as e.g. additional ID pins) or software overhead.

Figure 7:
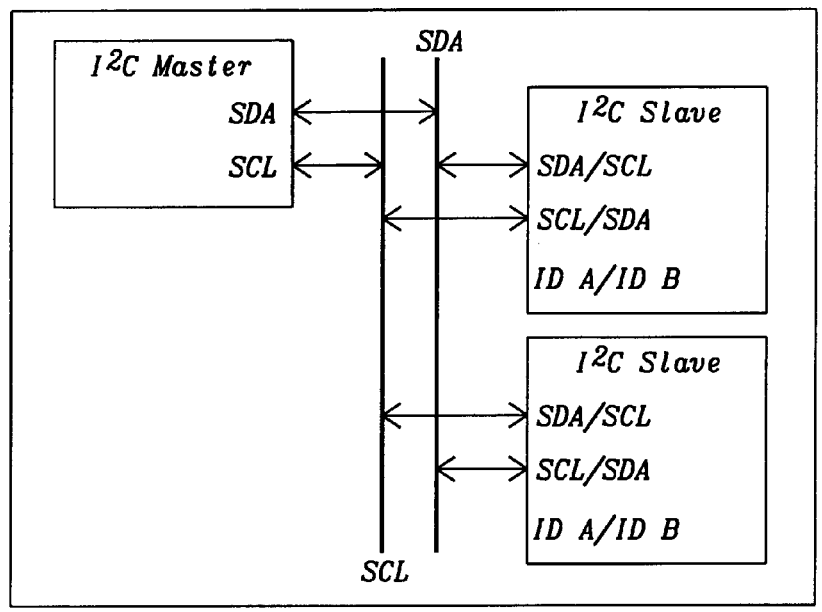
FIG. 7 illustrates basic principles of the present invention, namely the device invented allowing connecting two slave devices to the 2 lines SDA and SCL interchanged.

FIG. 7 illustrates basic principles of the present invention. The device invented allows connecting two slave devices to the 2 lines SDA and SCL interchanged. It is up to the slaves to detect the signal connectivity to be used for communication with the master. Based on the detected signal connectivity the slave address can be selected by the slave device itself. This allows a signal connectivity of two identical devices. FIG. 7 shows possible connections of such devices in a system. Each I²C slave has two Slave ID decoders, signified by ID A and ID B.

The slave devices detect the signal connectivity by interpreting the I²C transfer in normal and interchanged connectivity as illustrated also in FIG. 8.

As soon as any correct device ID transmission is detected in one of the modes, i.e. normal or interchanged, the signal connectivity is known and the signal connectivity selection is fixed. Up from this point of time the connection for the I²C lanes is known and the correct slave is selected. The transmitted slave device ID for the signal connectivity check does not need to be one of the IDs intended for that device; furthermore any valid slave device ID even from other connected components can be used for the signal connectivity check detection.

Both slaves establish the communication at the same time. All slaves see the I2C communication while only one slave reacts on master requests. Thus, if there is any device ID transmission on the bus, both slaves detect the connectivity and know which device ID is assigned to it (but only the device, which has the transmitted device ID, assigned answers/reacts on the access. The other devices do not react on the access but they also know their connectivity/assigned device ID from this point of time).

This mechanism is sufficient to establish a correct communication as described by the following process steps describing a valid I²C transfer sequence with transmission of the slave address 1. Start condition (restart condition)
2. 7 bit slave address transmission
3. R/W bit transmission
4. ACK cycle It should be noted that a valid I²C transfer sequence is not limited to 7 bit addressing, e.g. there is also a 10 bit addressing given in the I2C specification. But there the first 7 bits (of the 10 bits) are transmitted in the same way.

Figure 8A:
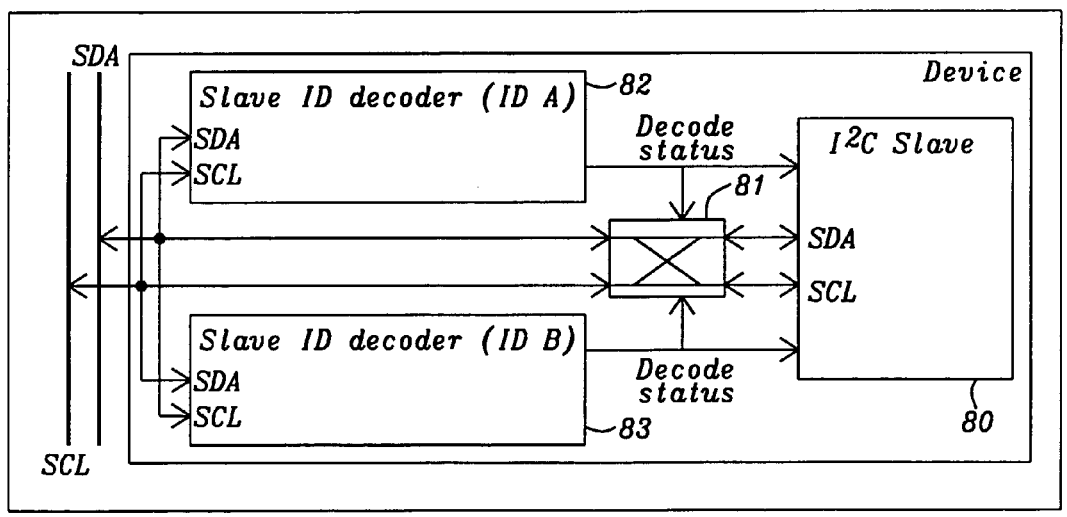
FIG. 8a shows a schematic of a preferred embodiment of the device invented.

FIG. 8a shows a schematic of a preferred embodiment of the device invented. The device invented comprises a slave device 80 as e.g. a camera being a part of a stereo camera system, a switching circuitry 81 interchanging the connections between the slave device 80 and the SDA/SCL lines, a slave ID decoder A 82 and a slave ID decoder B 83. Each decoder has two inputs, a SDA input and a SCL input. The SDA input of the decoder A 82 is connected to the SDA line and to the SCL input of the decoder B 83. The SCL input of the decoder A 82 is connected to the SCL line and to the SDA input of the decoder B 83.

At startup the switch position of switching circuitry 81 is unknown. The decoders 82 and 83 decode interchangeably the transfer sequence on both SDA/SCL lanes with transmission of the slave address and forward the decode status to the slave module 80. Both decoders check if they see a correct device ID transmission sequence on the bus. If one of the decoders detects this sequence the device locks and will have the device ID A (or ID B depending on which decoder has seen the sequence). As soon as one of the decoders detects the correct sequence the switching circuitry 81 is set and fixed.

This means that the connectivity of the device to the I2C bus lines SDA and SCL decides whether the device reacts on device ID A or device ID B.

Figure 8B:
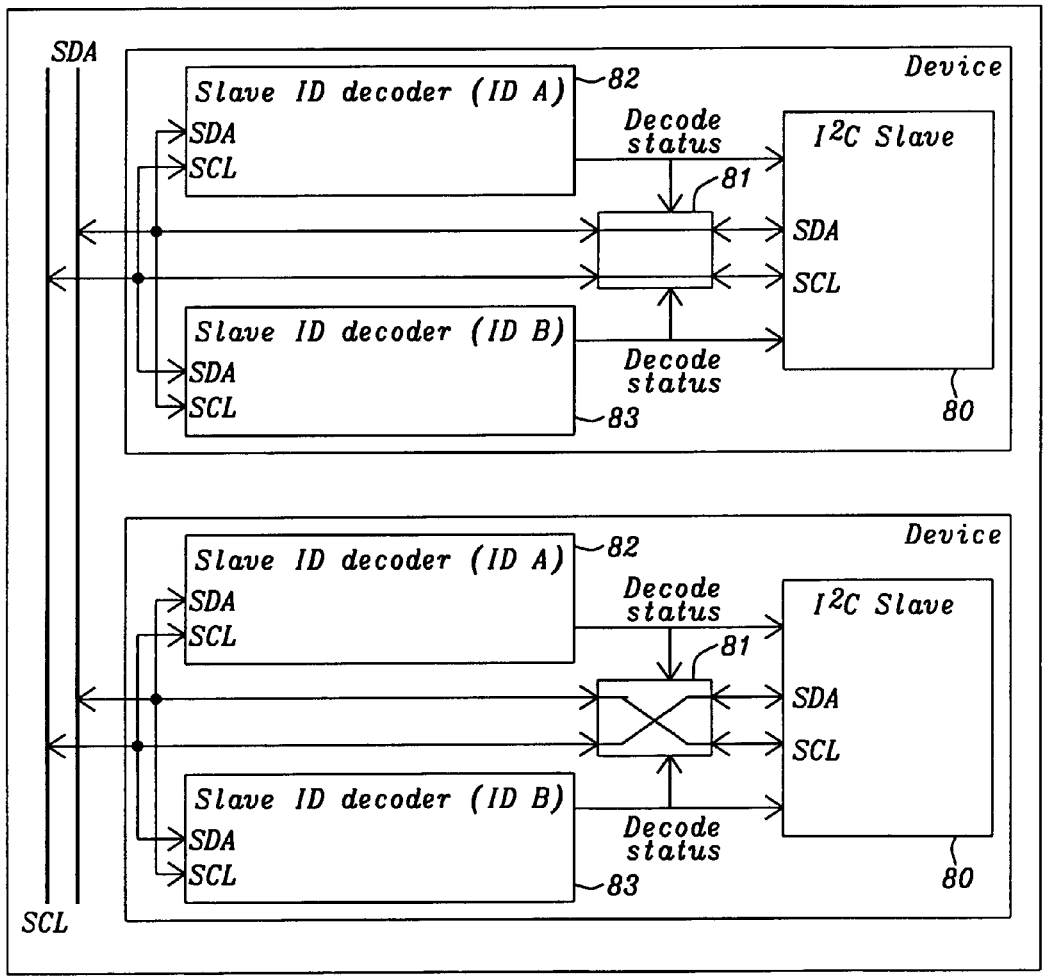
FIG. 8b illustrates the state of 2 identical devices on the same bus after decoding the connectivity and assignment of the selected device ID.

FIG. 8b illustrates the state of two identical devices 80 on the same bus after decoding the connectivity and assignment of the selected device ID.

The switching circuitry 81 needs to know which slave decoder has seen the correct sequence on the bus and need to switch the connectivity to circuitry 80 accordingly.

The I2C slave circuitry 80 is not able to react on accesses until the correct connectivity is evaluated. The correct connectivity is evaluated after the first device ID is transmitted on the bus. If the first device ID on the I2C bus is the one which is assigned to this device the circuitry 80 has to react immediately (send acknowledge) although it does not know which device ID was transmitted. This information needs to be forwarded from the decoder to circuitry 80 to allow proper reaction also for the case that the first access on the I2C bus targets this device.

Any device decoding this sequence with interchanged SDA/SCL lane connections is recognizing either a start/stop event within the transmission and needs to restart its internal state machine or the correct connected decoder is seeing a valid sequence. Because any valid sequence freezes the connectivity selection a long-term accumulation of events emulating a slave address transmission on the interchanged changed connection is avoided.

Thus 2 identical devices or components can be connected to the same bus without any hardware or software (power up strategy) overhead. The devices can be used immediately with their device ID assigned and selected by the connectivity of the I2C lanes.

Figure 9:
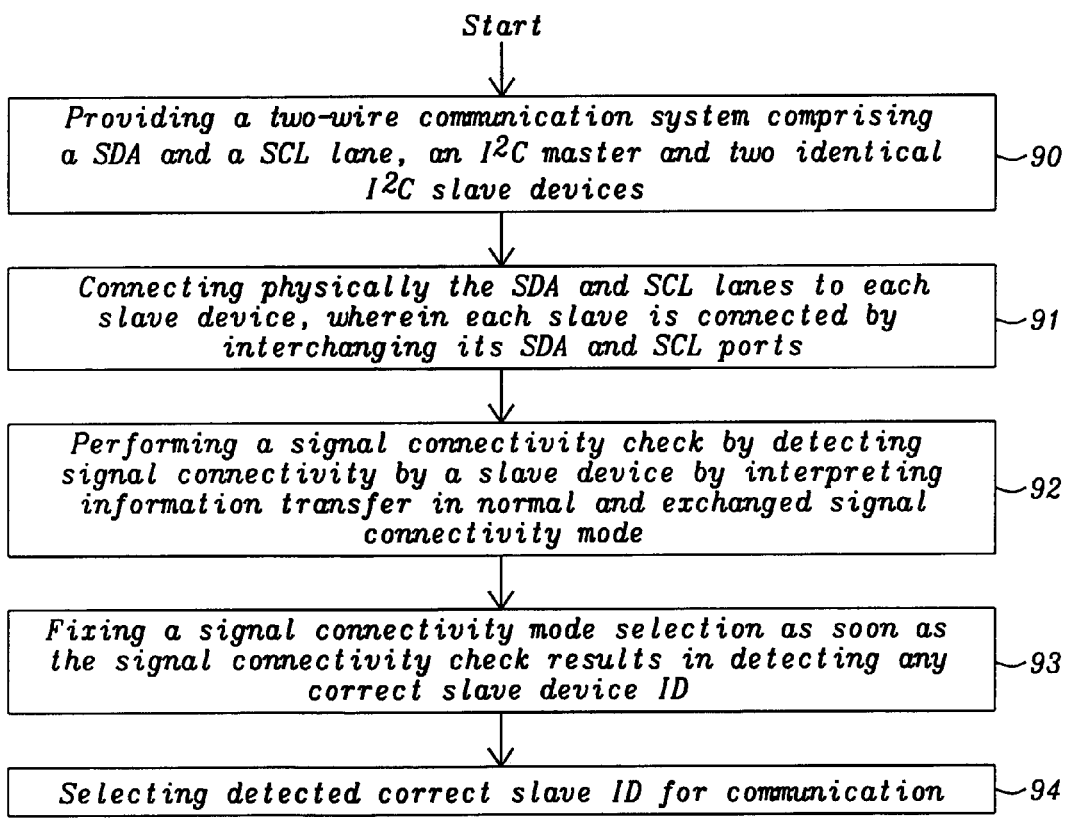
FIG. 9 illustrates a flowchart of a method invented to differentiate identical devices on a two-wire interface.

FIG. 9 illustrates a flowchart of a method invented to differentiate identical devices on a two-wire interface.

Step 90 of the method of FIG. 9 illustrates the provision of a two-wire communication system comprising a SDA and a SCL lane, an I²C master and two identical I²C slave devices. Step 91 depicts connecting physically the SDA and SCL lanes to each slave device, wherein each slave is connected by interchanging its SDA and SCL ports. Step 92 illustrates performing signal connectivity check by detecting signal connectivity by a slave device by interpreting information transfer in normal and exchanged connectivity modes. Step 93 shows fixing a signal connectivity mode selection as soon as any correct slave device ID is detected and, finally, step 94 illustrates selecting detected correct slave ID for communication.

While the invention has been particularly shown and described with reference to the preferred embodiments thereof, it will be understood by those skilled in the art that various changes in form and details may be made without departing from the spirit and scope of the invention.

What is claimed is:

1. A method to differentiate identical devices having a same device address on a two-wire interface, comprising the following steps:

(1) providing a two-wire communication system comprising a SDA lane and a SCL lane, an I²C master and two identical I²C slave devices having the same device address;

(2) connecting physically the SDA and SCL lanes to each slave device, wherein a SDA port of a first slave device is connected to the SDA lane and a SCL port of the first slave device is connected to the SCL lane and a SDA port of a second slave device is connected to the SCL lane and a SCL port of the second slave device is connected to the SDA lane;

(3) performing signal connectivity check by detecting signal connectivity on the SDA lane and the SCL lane with the first and second slave devices by interpreting information transfer in normal and exchanged signal connectivity modes; and (4) connecting a first I²C slave module in the first slave device and a second I²C slave module in the second slave device to the SDA lane and the SCL lane in a first configuration responsive to detecting the information transfer in the normal signal connectivity mode and in a second configuration responsive to detecting the information transfer in the exchange signal connectivity mode.

2. The method of claim 1 wherein the signal connectivity check is performed by transmitting slave device IDs.

3. The method of claim 2 wherein any valid slave device ID, even from other connected components, can be used for the signal connectivity check detection.

4. The method of claim 1 wherein both slave devices establish communication at the same time.

5. The method of claim 1 wherein the information transfer comprises an I²C transfer sequence with transmission of the slave address comprising:
   (1) a start/restart condition;
   (2) at least a 7 bit slave address transmission;
   (3) Read/Write bit transmission; and
   (4) acknowledgement (ACK) cycle.

6. The method of claim 5 wherein any wrongly connected slave device decoding the I²C transfer sequence recognizes a start/stop event within the information transfer and restarts its internal state machine.

7. The method of claim 5 wherein a correctly connected decoder of a slave device recognizes the information transfer.

8. The method of claim 5 wherein any valid information transfer detected freezes the signal connectivity selection.

9. The method of claim 5 wherein a 10-bit slave address transmission is used.

10. An I²C interface system for use with slave devices having a same device address, comprising:

an I²C control bus including a serial data line (SDA) lane and a serial clock line (SCL) lane;

a first and second slave devices each associated with a same first device address and having a first and second slave device inputs, the first slave device having the first slave device input connected to the SDA lane and the second slave device input connected to the SCL lane, the second slave device having the first slave device input connected to the SCL lane and the second slave device input connected to the SDA lane, each of the first and second slave devices, comprising:

a first slave decoder having a first SDA input connected to the first slave device input and a first SCL input connected to the second slave device input and a first decode output, the first slave decoder detecting a first signal connectivity on the SDA lane and the SCL lane and generating a first decode status output on the first decode output responsive to detection of the first signal connectivity;

a second slave decoder having a second SDA input connected to the second slave device input and a second SCL input connected to the first slave device input and a second decode output, the second slave decoder detecting a second signal connectivity on the SDA lane and the SCL lane and generating a second decode status output on the second decode output responsive to detection of the second signal connectivity;

switching circuitry having a first input connected to the SDA lane and a second input connected to the SCL lane, the switching circuitry further having first and second outputs, wherein the first input and the second input are selectively connected to the first output and the second outputs, respectively, responsive to the first decode status output and the second decode status output;

an I²C slave module having the first device address associated therewith and having an SDA input port connected to the first output of the switching circuitry and an SCL input port connected to the second output of the switching circuitry.

11. The system of claim 10 wherein both first and second decoder decode interchangeably the transfer sequence on both SDA/SCL lanes with transmission of the slave device address and forward the decode status to the slave module.

12. The system of claim 10 wherein at startup the switch position of switching circuitry is unknown.

13. The system of claim 10 wherein, as soon as one of the decoders detects the first or the second signal connectivity, the switching circuitry is set and fixed.

* * * * *